United States Patent [19]

Boerma et al.

[11] Patent Number: 4,696,911
[45] Date of Patent: Sep. 29, 1987

[54] NICKEL BORIDE-POLYMER CATALYST

[75] Inventors: Hiepke Boerma, Vlaardingen; Rudolph O. de Jongh, The Hague; Cornelis Van Dijk, Zwijndrecht, all of Netherlands

[73] Assignee: Unilever Patent Holdings B.V., Netherlands

[21] Appl. No.: 919,643

[22] Filed: Oct. 16, 1986

[30] Foreign Application Priority Data

Oct. 18, 1985 [EP] European Pat. Off. ........ 85201708.6

[51] Int. Cl.$^4$ ............................................. B01J 31/06
[52] U.S. Cl. .................................... 502/159; 502/207; 260/409
[58] Field of Search ................................ 502/159, 207

[56] References Cited

U.S. PATENT DOCUMENTS

| 3,392,059 | 7/1968 | May ................................. | 502/207 X |
| 4,327,235 | 4/1982 | Nakao et al. ......................... | 585/270 |
| 4,339,345 | 7/1982 | Nakao et al. ...................... | 502/207 X |
| 4,551,441 | 11/1985 | Van Dijk et al. ................ | 502/207 X |
| 4,600,701 | 7/1986 | de Jongh et al. ................... | 502/159 |

FOREIGN PATENT DOCUMENTS

| 159101 | 4/1985 | European Pat. Off. ............ | 502/159 |
| 132889 | 7/1986 | European Pat. Off. ............ | 502/159 |
| 2519580 | 11/1976 | Fed. Rep. of Germany ...... | 502/207 |

Primary Examiner—Patrick P. Garvin
Attorney, Agent, or Firm—Cushman, Darby & Cushman

[57] ABSTRACT

Nickel boride hydrogenation catalysts stabilized with polyvinylpyrrolidone, having constant excellent quality, are prepared by incorporating glycerol monooleate before the alcohol is evaporated off.

8 Claims, No Drawings

NICKEL BORIDE-POLYMER CATALYST

The invention relates to hydrogenation catalysts, more particularly the invention relates to very finely dispersed nickel boride catalysts which are stabilised with an organic linear polymer containing pyrrolidone groups, and the use of the catalyst.

Such catalysts are already known in the art. For instance, European patent specification (EP-B) No. 8407 (Pharmaceutische Fabrik Heyl) describes colloidal metal catalysts of the elements of the 8th sub-group of the periodic table which are incorporated in a solution of a linear polymer. Example 22 describes a nickel catalyst stabilised with polyvinylpyrrolidone; propanol is used as the solvent. This catalyst is used in the hydrogenation of "Becel oil".

U.S. patent application Ser. No. 4 327 235 (Nakao) describes colloidal nickel boride catalysts, stabilised with polyvinylpyrrolidone in alcohol, and the use thereof in the hydrogenation of unsaturated compounds having a double bond attached to a tertiary carbon atom. This double bond is hydrogenated without any other double bonds being affected.

Furthermore there is European patent application (EP-A) No. 132889 (Unilever) which discloses a finely divided nickel boride hydrogenation catalyst which is stabilised with an organic linear polymer dispersed in a fatty substance like a triglyceride oil or a fatty amide. The catalyst is stable upon storage and has a good selectivity. This catalyst yields excellent results in hydrogenation processes.

Also there is European patent application (EP-A) No. 159101 (Unilever), which is not a prior publication, describing more active nickel boride catalysts prepared by reduction with alkali borohydride of solutions of nickel salts which contain less than 5 moles of crystal water.

The present invention now provides a very active, finely dispersed nickel boride catalyst composition which has been stabilised with a linear organic polymer which comprises pyrrolidone groups and which composition also contains a partial fatty acid polyol ester in an amount which ranges between 5 and 0.5 times the weight of nickel. Preferably the amount of ester is between 3 and 1 times the weight of nickel.

For the preparation of the nickel boride a nickel salt, e.g. halogenide, is used, such as nickel chloride with 6, 4 or less molecules of crystal (lattice) water, particularly nickel chloride dihydrate. Other salts, e.g. nickel acetate, can also be used if they contain non-reducible anions. Preferably the salts contain less than 5 molecules of crystal water. Anhydrous salts can also be used.

The catalyst made according to the present invention is very active and very stable. The catalyst is excellent for use in the hydrogenation of unsaturated compounds, in particular fatty compounds such as triglycerides. During hydrogenation of such triglycerides the very high activity is striking, particularly at low temperatures, and the high selectivity is also noteworthy because little triglyceride with only saturated fatty acid residues is formed (low percentages of solids are determined by n.m.r. at 30° and 35° C.), and the remaining unsaturated bonds have primarily a cisconfiguration.

It is preferable to disperse this catalyst in oil, e.g. as triglyceride. Preferably the nickel boride is very finely dispersed with an organic polymer in the triglyceride and the average particle size is between 0.5 and 10, preferably between 1 and 5 nanometres. The amount of linear organic polymer in the oil suspension of the catalyst is usually between 0.5 and 5% by weight and the amount of nickel boride, calculated as nickel, is between 0.1 and 5% by weight. In the catalyst system the atomic ratio of boron to nickel is between 1 and 3:1. A polar linear polymer containing vinylpyrrolidone and optionally other monomeric groups is normally used. A copolymer of vinylpyrrolidone and vinylacetate (PVP/VA) is preferred. The average molecular weight of the polymer used is between 20,000 and 250,000, and preferably between 30,000 and 80,000.

The catalyst is prepared in a solvent, usually in a volatile polar solvent such as a $C_1$–$C_3$ alkanol. Preferably ethanol is be used.

The catalyst according to the invention can be made by adding a solution or suspension of alkali borohydride (preferably $NaBH_4$) to a solution or suspension of the nickel salt in an atomic ratio B:Ni =(1.5-3):1, at least one of the solutions containing the linear organic polymer dissolved therein. The addition is made in a hydrogen or inert gas atmosphere at a temperature of between 0° and 80° C., preferably between 20° and 60° C., leading to the formation of very finely dispersed nickel boride. According to the present invention a partial ester of a polyol and fatty acid is also incorporated in the solution of the organic polar solvent. The amount of partial ester normally present is from 5–0.5 times the weight of nickel, preferably between 3 and 1 times the amount of nickel. $C_{10}$–$C_{20}$ fatty acid esters are preferred and so are unsaturated fatty acid esters.

On completion of the reduction, oil is added to the system. After addition of the oil, the solvent is often removed, for instance by vacuum evaporation at a temperature between 15° and 60° C., with stirring.

The oil or fat in which the catalyst is suspended preferably has a melting point below 40° C.

It was found that the transfer of the nickel boride to the oil is improved by addition of a fatty acid partial ester such as glycerol mono-oleate (G.M.O.) or monostearate. Evaporation of alcohol at 50° C. can proceed faster and without foaming occurring, giving better and reproducible catalysts of high activity and high selectivity. The polyol partial ester can be added to the organic polar solution before or after the reduction with alkali borohydride. Preferably, especially in the case of unsaturated fatty acid partial esters, it is added after the reduction. Partial esters containing glycerol mon-oleate are preferred.

The invention also comprises a process for hydrogenating unsaturated fatty compounds derived from $C_{10}$–$C_{24}$ carboxylic acids, particularly triglycerides, fatty acid methylesters and nitriles, using a finely dispersed nickel boride catalyst prepared from a suitable nickel salt, stabilised with a linear organic polymer and a partial polyol fatty acid ester. Between 5 and 500 ppm, preferably between 5 and 200 ppm nickel is usually added in the form of nickel boride (ppm equals here mg Ni per kg unsaturated compound). The hydrogen pressure is between 100 and 5000 kPa and the reaction mixture is stirred. The hydrogenation temperature is between 20° and 180° C. On completion of the hydrogenation, the catalyst and polymer are removed, partly by filtration and/or by washing with a dilute acid solution, e.g. citric acid, and, if necessary, by treating the oil with bleaching earth.

The present invention accordingly provides novel and very active hydrogenation catalyst compositions comprising finely divided nickel boride stabilised with a linear polymer containing pyrrolidone and also containing a partial fatty acid polyol ester group, which catalyst compositions are so active that with said catalyst neutralised, bleached and deodorised soybean oil with an iodine value of between 130 and 135 can be hydrogenated in a 1 liter Parr autoclave (ex Parr Instrument Comp. Inc., Ill., U.S.A.) at 110° C. and 600 kPa hydrogen pressure with a head space of 50% of the capacity and a stirring rate of 700 r.p.m. with 50 ppm of nickel (calculated as metal) to a decrease in iodine value of the soyabean oil of 35 units in less than 35 minutes.

More in particular, the present invention provides a catalyst, having by the feature that the rate of iodine value decrease is at least 1 unit in iodine value per minute if the hydrogenation is carried out as described in the previous paragraph.

The rate of hydrogenation (iodine value decrease) per minute can be monitored conveniently by observing the refractive index of the oil and/or by following the consumption of hydrogen so as to determine the proper end point.

The invention will now be illustrated by the following. Examples.

EXAMPLE I

The catalyst was prepared in a three-necked flask connected to a gasmeter. 9.6 gram $NiCl_2 \cdot 6H_2O$ was heated at 55° C. for 30 minutes under vacuum by an oil pump to be converted to the dihydrate. 3 gram PVP/VA (50% alcoholic solution E 735, ex GAF-Europe, Schiedam, Netherlands) in 40 ml absolute ethanol was then added to the reactor. 3.8 gram $NaBH_4$ suspended in 160 ml absolute ethanol was added at room temperature and in a hydrogen atmosphere. 200 ml nickel boride solution was thus formed containing 1.2% nickel (calculated as metal).

To this solution 120 gram soyabean oil (IV 133) and 6 gram G.M.O. (glycerol mono-oleate 60%, ex PPF, Zwijndrecht) were added. Evaporation of alcohol was carried out in vacuo under stirring at 50° C. in 40 minutes. No foaming was observed and the catalyst was found to be very active.

For the purpose of comparison, the above was repeated in the absence of G.M.O. and the alcohol was evaporated in vacuo under stirring at approximately 35° C. in 120 minutes. At the end of the transfer, foaming occurs, hampering the evaporation. A 2% nickel boride (calculated as metal) dispersion is formed.

EXAMPLE II

Example I was repeated, but the nickel boride solution contained 4 gram polyvinylpyrrolidone (average molecular weight 40,000) K 30 (ex Fluka, Buchs, Germany) instead of the copolymer PVP/VA of Example I. Evaporation of the alcohol in vacuo was carried out at 50° C. in 25 minutes. Hardly any foaming occurred. The catalyst was active and selective.

For the purpose of comparison, the above Example was repeated, with the difference that no G.M.O. was present. Evaporation, in the absence of G.M.O., was carried out at 10° C. in 150 minutes with strong foaming. This catalyst was less active than the same catalyst containing G.M.O.

EXAMPLE III

Example I was repeated, with the difference that 6 gram G.M.O. was added to the reaction mixture before addition of $NaBH_4$. Evaporation of alcohol was carried out at 50° C. in 30 minutes. No foaming was observed and the catalyst was found to be very active and selective.

EXAMPLES IV-VI

The catalysts suspended in soyabean oil as described in Examples I, II and III were compared as to their activities. 450 gram soyabean oil (IV 133) was hydrogenated to IV 97-98 at 110° C. and 600 kPa hydrogen pressure in an autoclave having a capacity of 1 liter (ex Parr, Illinois, U.S.A.), stirred at 700 r.p.m.

With an input of 25 ppm Ni of the nickel boride suspension, a hydrogenation time is found of:

| Example I | 35 minutes | Comparison | 60 minutes |
|---|---|---|---|
| Example II | 60 minutes | Comparison | 90 minutes |
| Example III | 25 minutes | Comparison | 60 minutes |
| | | (according to Example I) | |

The activities of the catalyst compositions according to the invention in Examples I, II and III were found to be reproducible within a narrow range, whereas those of the comparisons were not quite reproducible.

We claim:

1. Catalyst composition comprising finely dispersed nickel boride stabilised with a linear polymer containing pyrrolidone groups, in which the composition also contains a partial fatty acid polyol ester in an amount which ranges between 5 and 0.5 times the weight of nickel.

2. Catalyst according to claim 1, in which the partial fatty acid polyol ester is a glycerol ester.

3. Catalyst according to claim 1, in which the partial fatty acid polyol ester is a $C_{10}$–$C_{26}$ fatty acid ester.

4. Catalyst according to claim 1, in which the fatty acid group of the ester contains at least one ethenic double bond.

5. Catalyst according to claim 1, in which the catalyst composition is dispersed in a medium of the class consisting of alcohol, fatty ester or fatty amide material.

6. Process for the preparation of a catalyst composition according to claim 1, whereby an at least partly dissolved nickel salt is reduced with alkali borohydride in the presence of a linear polymer which is also at least partly dissolved in a polar organic solvent, in which a partial fatty acid polyol ester is incorporated in the polar organic solution.

7. Process according to claim 6, in which the polar solvent is a $C_1$–$C_3$ alkanol.

8. Process according to claim 6, in which, after the nickel boride has been prepared, a triglyceride oil is added and the polar solvent is removed by evaporation.

* * * * *